(12) United States Patent
Subramaniam et al.

(10) Patent No.: US 7,473,467 B2
(45) Date of Patent: Jan. 6, 2009

(54) PREPARATION OF MICROCAPSULES

(75) Inventors: Anandaraman Subramaniam, East Windsor, NJ (US); Anne Reilly, Edison, NJ (US)

(73) Assignee: Firmenich SA, Geneva (CH)

( * ) Notice: Subject to any disclaimer, the term of this patent is extended or adjusted under 35 U.S.C. 154(b) by 971 days.

(21) Appl. No.: 10/234,775

(22) Filed: Sep. 3, 2002

(65) Prior Publication Data

US 2004/0041306 A1 Mar. 4, 2004

(51) Int. Cl.
*B32B 5/16* (2006.01)
*B01J 13/04* (2006.01)
*A61K 9/14* (2006.01)

(52) U.S. Cl. .............................. 428/402.21; 427/213.33; 427/213.34; 427/213.35; 427/213.36; 264/4.3; 264/4.4; 264/4.7

(58) Field of Classification Search ............. 428/402.2, 428/402.24, 403, 402, 402.21; 427/213.3, 427/213.31, 213.32, 213.33, 213.34, 213.35, 427/231.36; 264/4.1, 4.3, 4.4, 4.7
See application file for complete search history.

(56) References Cited

U.S. PATENT DOCUMENTS

| | | | |
|---|---|---|---|
| 2,800,457 A | 7/1957 | Green et al. ............ 252/316 |
| 2,800,458 A | 7/1957 | Green et al. ............ 252/316 |
| 3,574,132 A | 4/1971 | Mosier ................... 264/4.3 |
| 3,887,625 A | 6/1975 | Schulte-Elte ........... 260/617 |
| 4,460,792 A | 7/1984 | Schulte-Elte et al. ... 568/341 |
| 4,900,870 A | 2/1990 | Fehr et al. .............. 568/354 |
| 5,672,301 A | 9/1997 | Orly et al. .............. 264/4.1 |
| 5,700,397 A * | 12/1997 | Maeda et al. ......... 428/402.24 |
| 5,922,652 A | 7/1999 | Kowalski et al. ........ 50/129 |

FOREIGN PATENT DOCUMENTS

EP 0 385 535 B1 9/1990

OTHER PUBLICATIONS

Junyaprasert et al., "Effect of Process Variables on the Microencapsulation of Vitamin A Palmitate by Gelatin-Acacia Coacervation," Drug Development and Industrial Pharmacy, 27(6): 561-566.
International Search Report, application No. PCT/IB03/03764, dated Dec. 11, 2003.

* cited by examiner

*Primary Examiner*—Thao T. Tran
(74) *Attorney, Agent, or Firm*—Winston & Strawn LLP

(57) ABSTRACT

The invention relates to a complex coacervation process based on the use of type B gelatin as polycationic colloid, for the preparation of "Halal" certified flavor-containing microcapsules.

10 Claims, 2 Drawing Sheets

PREPARATION OF MICROCAPSULES

BACKGROUND OF THE INVENTION

The present invention relates to the food and flavor industry. It concerns more particularly a complex coacervation process for the preparation of microcapsules which can be "Halal" certified. The process of the invention is based on the use of type B gelatin as positively charged polymeric wall material.

Coacervation, also called aqueous phase separation, is a very well known technique for encapsulating hydrophobic liquids. A coacervation process allows to provide oil-containing microcapsules, the encapsulating material being a gelled hydrophilic colloid that is impervious to the oil and deposited evenly and densely about the oil as nucleus. The encapsulating material is a protein which may be complexed with another colloid having an opposite electric charge.

A coacervation process essentially involves an aqueous protein solution which is manipulated by changing the physico-chemical environment (dilution and/or adjustment of pH) to result in phase separation of the protein from the solution to varying degrees depending on the molecular weight of the protein, its isoelectric point and compatibility with solvents.

A coacervation process may be "simple" or "complex". The former designation is employed when a single protein is used to form a capsule wall as phase separation is taking place. The latter term designates the use of a second oppositely charged non-protein polymer to bring about phase separation. Complex coacervation method is widely practiced in commercial processes and has been well described in the literature. In particular, U.S. Pat. Nos. 2,800,457 and 2,800,458 disclose complex coacervation in a very detailed manner.

Generally, a coacervation process comprises four basic steps consisting in respectively emulsification, coacervation, wall formation and wall hardening. In a complex coacervation process the wall surrounding the core material is, as mentioned above, constituted of two oppositely charged high molecular weight colloids. In most of the cases, the positively charged colloid used is gelatin, a functional protein derived from collagen by hydrolysis and subsequent extraction. There are two commercially available food/pharmaceutical grade gelatins, designated as "type A" and "type B". The primary difference between the two grades, arises from the manufacturing process. If the collagen source is hydrolyzed by an acid, the final product gets a designation "A" and if it is done by a liming (base) it is designated "B". From a product standpoint, the two gelatins differ primarily in their isoelectric points. Type A has an isoelectric point of 8.5 to 9.0 while type B has 4.8 to 5.5. In a process such as coacervation that predominantly depends on the eletrokinetic stability of the system, such difference in isoelectric points can be critical for successful encapsulation.

The prior art related to complex coacervation almost always describe the use of type A gelatin as a cationic protein wall. The pH during the process is therefore kept to values inferior to the isoelectric point of the latter in order to have it positively charged. Some documents from the prior art mentions the possibility to use gelatin provided by basic hydrolysis as a cationic protein wall, but to our knowledge, no example has ever described such an embodiment and it has been established that the processes disclosed in the prior art do not allow the preparation of satisfactory microcapsules when type B gelatin is used as protein wall, in its cationic form. On the other hand, type B gelatin is sometimes mentioned in complex coacervation processes as being used as polyanionic polymer i.e. in its electronegative form, in combination with a type A gelatin as positively charged colloid.

Now, as with many food ingredients, there are some regulatory constraints on gelatin uses, from a religious/ethnic standpoint. This includes "Kosher" and "Halal" status of gelatin. Generally, type A gelatin manufacturing process uses pig skin as starting material. As a consequence the microcapsules produced from this starting product cannot receive the "Halal" or "Kosher" status. Type B gelatin, on the other hand, issued from cows, could receive this certification. However, no complex coacervation process disclosed in the prior art to date technically allows the preparation of microcapsules based on type B gelatin.

Now, we have been able to establish a novel coacervation process suitable for the preparation of microcapsules based on type B gelatin as cationic wall material.

Varaporn Buraphacheep Junyaprasert et al. describe in Drug Development and Industrial Pharmacy, 27(6), 561-566 (2001), a complex coacervation process for the encapsulation of Vitamin A, which uses type B gelatin in combination with gum acacia as wall materials. However, the process parameters there-disclosed are not optimized, in particular, the drug contents of the microcapsules do not exceed 50% w/w.

The process according to the present invention allows to overcome the drawbacks observed in the prior art by providing an optimized complex coacervation process suitable for the preparation of microcapsules susceptible of being "Halal" certified, and containing up to 80% w/w of hydrophobic core material.

SUMMARY OF THE INVENTION

The invention relates to a novel complex coacervation process, specially suitable for the preparation of high fix microcapsules encapsulating a hydrophobic core, such microcapsules being susceptible of being incorporated into "Halal" certified foods or flavors. The process of the invention uses type B gelatin as polycationic colloid, in combination with a polyanionic material. The process parameters, such as pH, or orders of the processing steps, are critical for a successful encapsulation. More particularly, the process is characterized by the fact that the pH is adjusted before the emulsification or dispersion step, to a value between 3.0 and 4.7.

The invention also relates to the microcapsules that are produced by this process. These microcapsules can be "Halal" certified and they comprise up to 80% of hydrophobic core material.

The invention also relates to a method for imparting, improving or modifying the organoleptic properties of a flavoring composition, wherein microcapsules prepared by the process of the invention, are added to said composition.

DETAILED DESCRIPTION OF THE PREFERRED EMBODIMENTS

Figure 1:
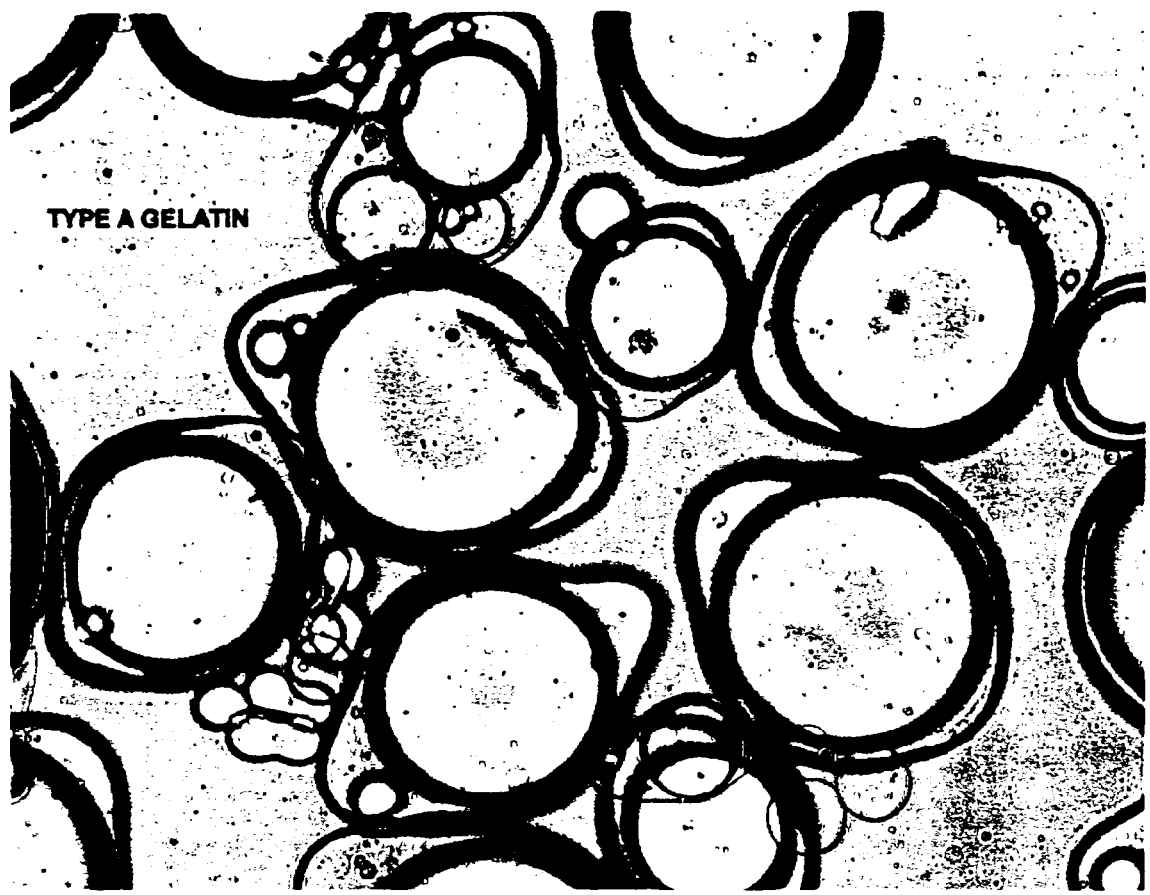
FIGS. 1 and 2 (FIGS. 1 and 2) are microscopic pictures at 10× magnification of complex coacervates prepared respectively with type A (FIG. 1) and type B (FIG. 2) gelatin as cationic polymers.

The present invention relates to a process for the preparation of microcapsules comprising a hydrophobic core material, which process comprises the steps of: a) mixing a positively and a negatively charged high molecular weight colloid solution; b) adjusting the pH of the mixture to a value comprised between 3.0 and 4.7; c) emulsifying or dispersing a hydrophobic core material in the mixture; d) subjecting the emulsion or dispersion obtained under c) to water dilution and/or pH adjustment to achieve coacervation; e) cooling the coacervate obtained under d) to provide wall formation of microcapsules; and f) adding a hardening agent; the process being characterized by the fact that the positively charged high molecular weight colloid is a type B gelatin.

What is meant by "high molecular weight" is typically a molecular weight comprised between 40,000 and 100,000.

The terms "core material" encompass hydrophobic liquid materials which are usually subjected to encapsulation by coacervation, as well as solids or solids suspended in a hydrophobic liquid.

Although some documents from the prior art cite type B gelatin as a possible starting material for a complex coacervation process, it turned out that the disclosed processes cannot in fact allow to produce satisfactory microcapsules based on this wall forming material, unless type B gelatin is in its anionic form. Now, the process of the invention allows the preparation of very efficient delivery systems based on the use of type B gelatin in its cationic form, which systems present the advantage of containing a very high load of hydrophobic core material and on the other hand of being in accordance with religious/ethnic regulatory constraints. Other advantages of the invention will appear further in the description, as well as in the example below.

In the first step of the process according to the invention, two solutions of, on the one hand, a positively charged high molecular weight colloid, and on the other hand, a negatively charged high molecular weight colloid, are mixed together. The process is characterized by the fact that the positively charged high molecular weight colloid is a type B gelatin. The use of type B gelatin in its cationic form is very unusual in this type of process. It implies that the pH of the solution is set to a value below its isoelectric point i.e. below 4.8-5.5.

As mentioned above, type B gelatin is obtained from basic hydrolysis of a collagen source. The base catalyzed hydrolysis takes several days to complete. Details of the process are well known by a skilled person in the art.

As the negatively charged colloid, any anionic polymer that reacts with the protein to form complex coacervates will suit the process of the invention. In particular gum arabic, sodium alginate, agar, carrageenan, carboxymethyl cellulose, sodium polyacrylate or polyphosphoric acid are suitable anionic polymers for the purpose of the invention.

In a particular embodiment, the ratio between gelatin and the oppositely charged colloid is of 3:2.

Step b) of the process of the invention consists in adjusting the pH of the mixture obtained under step a) to a value comprised between 3.0 and 4.7. This can be typically achieved by means of addition of lactic acid. This step is essential in the process of the invention, in terms of specific pH values, as well as from a process stage point of view. In fact, the adjustment is operated before the addition of the core material, contrary to the processes disclosed in the prior art, wherein the pH is usually adjusted after emulsification or dispersion step. Now, in an unexpected manner, it turned out that the adjustment of the pH to a suitable value at this particular stage of the process, is responsible for an efficient wall formation of the microcapsules.

Once the pH is adjusted, a hydrophobic core material is emulsified or dispersed in the mixture. As mentioned above, the core material may consist of a hydrophobic liquid, as well as of a solid or yet a solid dispersed in a hydrophobic liquid.

In a particular embodiment of the invention, the core material to be encapsulated is a liquid flavor ingredient or composition. These terms can define a variety of flavor materials of both natural and synthetic origin. They include single compounds or mixtures. Specific examples of such components may be found in the current literature, e.g. in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of flavoring and/or aromatizing consumer products, i.e. of imparting a flavor or taste to a consumer product traditionally flavored, or of modifying the taste of said consumer product.

Natural extracts can also be encapsulated into the system of the invention; these include e.g., citrus extracts such as lemon, orange, lime, grapefruit or mandarin oils, or coffee, tea, mint, cocoa, vanilla or essentials oils of herbs or spices, among others.

The proportions of hydrophobic ingredient or composition are comprised between 35 and 90% by weight of gelatin.

The process of the invention is of course also suitable for the encapsulation of other core materials than flavoring ingredients, such as perfuming ingredients, pharmaceuticals or cosmetic ingredients.

The following steps of the process are respectively coacervation by water dilution and/or pH adjustment, followed by the cooling of the coacervate to provide wall-formation. The cooling must be carried out to a temperature where the colloids do gel. In a particular embodiment, the cooling rate is comprised between 0.25 and 0.5° C./min.

Finally, a hardening agent is added in order to cross-link the wall formed around the hydrophobic core material. Typical examples of hardening agents suitable for the purpose of the invention include formaldehyde, acetaldehyde, glyoxal, glutaraldehyde, chrome alum and the like.

Microcapsules susceptible of being obtained by a process according to the invention constitute another object of the invention. These delivery systems present the advantage of being potentially "Halal" certified, and can therefore be used for the flavoring of so-designated final consumer products.

On the other hand, the microcapsules of the invention are very highly loaded in hydrophobic core material. More particularly, the microcapsules may contain up to 80% by weight of a hydrophobic core material, while the processes disclosed in the prior art only allowed to have up to 35% by weight of active ingredient in the capsules.

Figure 2:
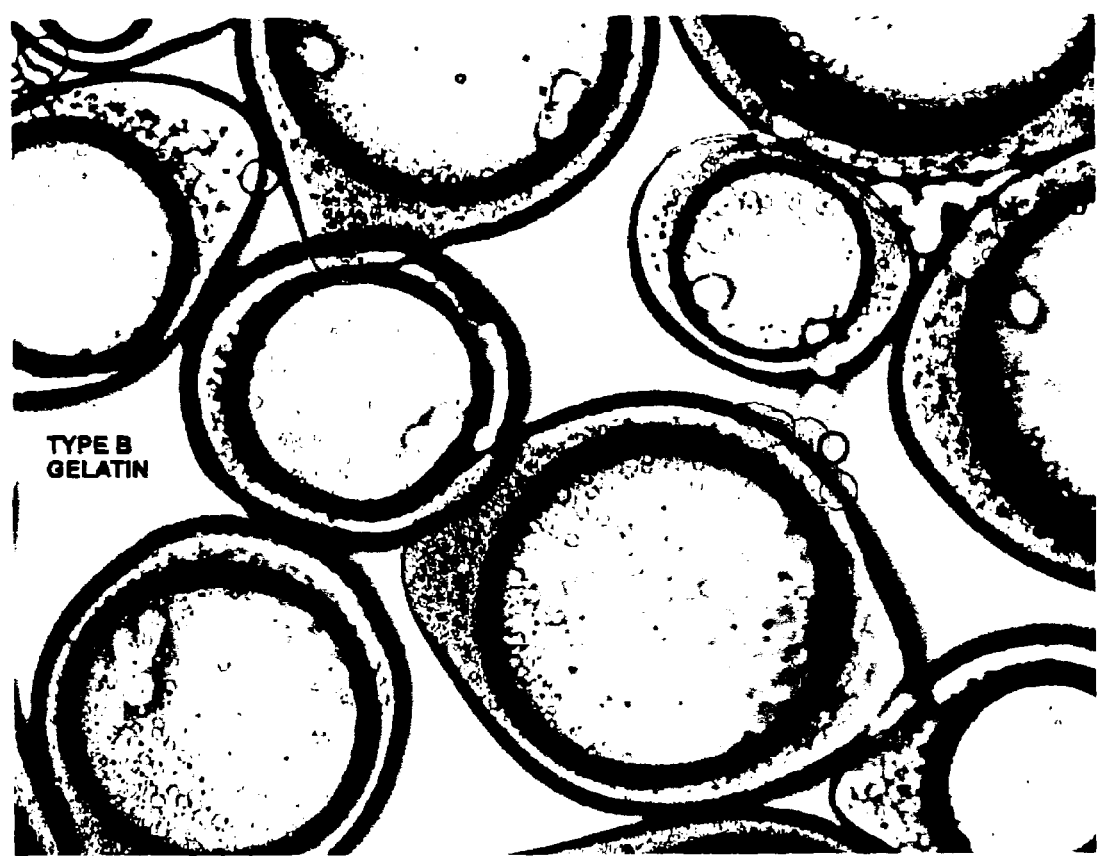

The final products have a wall thickness and a morphology very satisfactory and comparable to that of microcapsules prepared starting from type A gelatin at same fix level, as revealed by microscopic pictures shown in FIG. 1 and 2.

The microcapsules produced by the process of the invention can be used in many kinds of applications in the field of foods and flavors. Therefore, flavoring compositions comprising the microcapsules according to the invention together with other flavoring coingredients, are also objects of the present invention.

EXAMPLES

The invention will now be described in a more detailed manner in the example below, wherein the temperatures are indicated in degrees Celsius and the abbreviations have the usual meaning in the art.

Example 1

Preparation of Microcapsules According to the Process of the Invention Compared with other Processes Type B gelatin (250 Bloom, origin: SKW Biosystems, USA), gum arabic, cold pressed orange peel oil, limonene, eugenol, and octyl acetate were used for the preparation of microcapsules. Several trials were made, varying the concentrations of colloids, the pH of the system, the amount of dilution water, the order of addition and the ratio of gelatin to gum arabic.

Table 1 reports the amounts of ingredients used in each trial.

TABLE 1

Amounts of gelatin, water, gum arabic, water, flavor and dilution water in the process of the invention

| Trial # | 1 | 2 | 3 | 4 | 5 |
|---|---|---|---|---|---|
| Gelatin [g] | 9 | 9 | 7.5 | 9 | 9 |
| Water [g] | 100 | 100 | 100 | 100 | 100 |
| Gum arabic [g] | 6 | 6 | 7.5 | 6 | 6 |
| Water [g] | 150 | 150 | 150 | 150 | 150 |
| Flavor [g] | 60 | 60 | 60 | 60 | 60 |
| Dilution water [g] | 200 | 400 | 400 | 200 | 200 |

Procedure for Preparation

All the microcapsules were prepared by a process comprising the basic steps of emulsification or dispersion, coacervation (water dilution), wall-forming (cooling) and cross-linking. However, from one trial to another, the proportions of ingredients and/or the stage of pH adjustment in the process were changed. In all the trials, the colloid solutions were mixed at a temperature of 37-40°. The final temperature of the system was 22-24°. The pH was adjusted by addition of lactic acid. The cooling rate was between 0.25 and 0.5°. After cooling the batch to the final temperature, 0.14% by weight of glutaraldehyde solution (25%) were added to cross-link the protein wall.

Trial #1: Components were mixed in the following order: the flavor (cold pressed orange peel oil) was emulsified in a mixture of gelatin solution and gum arabic solution. Dilution water was added. The batch pH was then adjusted from 4.64 to 2.82 in decrements but there was practically no wall formation.

Trial #2: The trial was identical to trial 1, except for doubling the amount of dilution water. Trial was unsuccessful.

Trial #3: Identical to trial #2 except that the concentrations of the colloid solutions were changed along with the ratio. Trial was unsuccessful.

Trial #4: Identical to trial #1 in formulation. Order of addition was changed. After mixing the colloid solutions, pH was adjusted to 3.0 with lactic acid, prior to the addition of flavor oil. Excellent wall formation was observable. This trial proves the importance of the pH adjustment' stage in the process.

Trial #5: Everything was done like in trial #4, except that the flavor consisted of a 60:20: 20 mixture of limonene, eugenol and octyl acetate. Trial was successful.

It can be concluded from the above experiments that the preparation of microcapsules with type B gelatin is successful as long as the pH of the colloid solution is suitably adjusted and as long as this is done prior to the addition of the hydrophobic core material.

What is claimed is:

1. An improved process for the preparation of microcapsules comprising a hydrophobic core material, which process comprises the steps of:
    a) mixing gelatin with a negatively charged high molecular weight colloid;
    b) emulsifying or dispersing a hydrophobic core material in the mixture;
    c) subjecting the emulsion or dispersion obtained under b) to water dilution and/or pH adjustment to achieve coacervation;
    d) cooling the coacervate obtained under c) to provide wall-formation of microcapsules; and
    e) adding a hardening agent;
wherein the improvement comprises using a positively charged high molecular weight a type B gelatin and adjusting the pH of the mixture obtained in a) to a value comprised between 3.0 and 4.7 before step b).

2. The process according to claim 1, wherein the ratio between gelatin and the negatively charged colloid is 3 to 2.

3. The process according to claim 1, wherein the cooling in step d) is carried out at a rate of between 0.25 and 0.50° C./min.

4. The process according to claim 1, wherein the hydrophobic core material is a flavor ingredient or composition.

5. Microcapsules obtainable by the process according to claim 1.

6. Microcapsules according to claim 5, comprising up to 80% of hydrophobic core material load.

7. A method for imparting, improving or modifying the organoleptic properties of a flavoring composition, which comprises adding to said composition, microcapsules according to claim 5.

8. Microcapsules comprising gelled walls of a high molecular weight colloid of type B gelatin which at least partially surround cores of hydrophobic material.

9. Microcapsules according to claim 8, comprising up to 80% of hydrophobic core material load.

10. A method for imparting, improving or modifying the organoleptic properties of a flavoring composition, which comprises adding to said composition, microcapsules according to claim 8.

* * * * *

UNITED STATES PATENT AND TRADEMARK OFFICE
CERTIFICATE OF CORRECTION

PATENT NO. : 7,473,467 B2 Page 1 of 1
APPLICATION NO. : 10/234775
DATED : January 6, 2009
INVENTOR(S) : Subramaniam et al.

It is certified that error appears in the above-identified patent and that said Letters Patent is hereby corrected as shown below:

On Title Page:
Item (56) References Cited, OTHER PUBLICATIONS, Junyaprasert et al. reference, after "561-556" insert -- (2001) --.

Column 6:
Line 22, before "type B gelatin" delete "a".
Line 28, change "0.50°" to -- 0.5° --.

Signed and Sealed this

Twenty-fourth Day of February, 2009

JOHN DOLL
*Acting Director of the United States Patent and Trademark Office*